May 23, 1967   D. McCUTCHEON SLOAN ET AL   3,321,354
APPARATUS FOR MAKING GUSSETED PLASTIC BAGS
Filed Aug. 11, 1964                                         4 Sheets-Sheet 1

INVENTORS
Douglas McCUTCHEON SLOAN
Alex TUNNER

AGENT

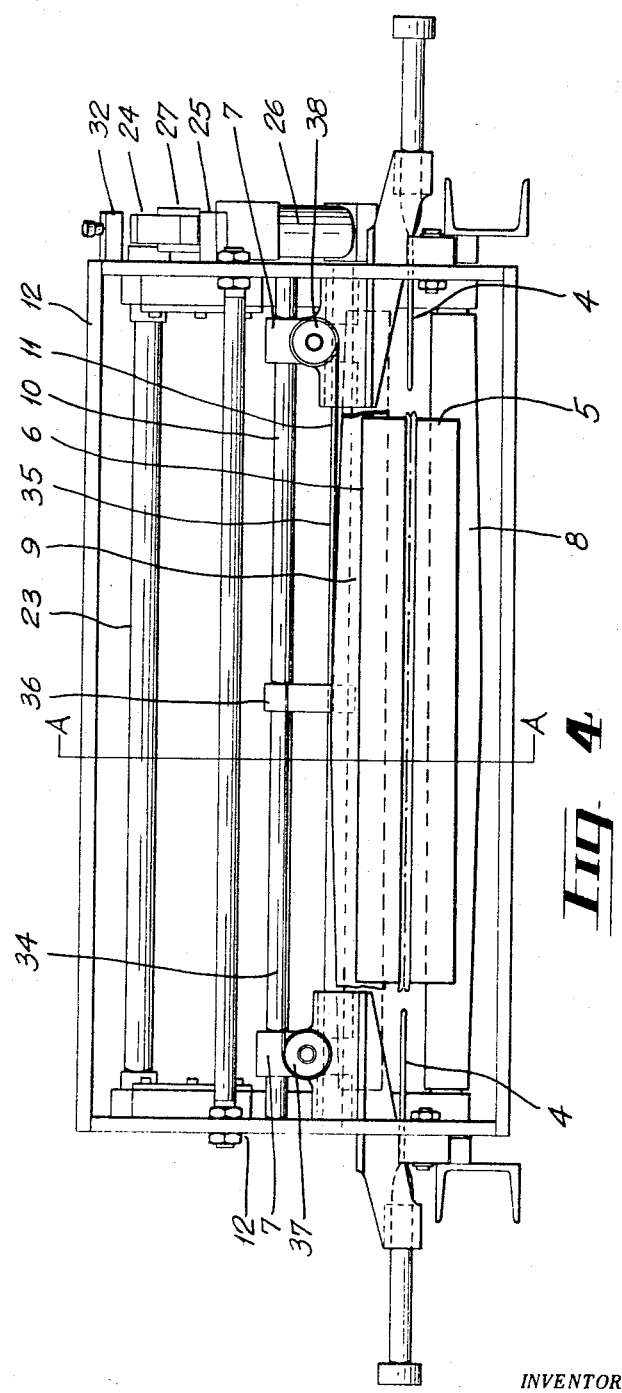

May 23, 1967   D. McCUTCHEON SLOAN ETAL   3,321,354
APPARATUS FOR MAKING GUSSETED PLASTIC BAGS
Filed Aug. 11, 1964   4 Sheets-Sheet 4

INVENTORS
Douglas McCUTCHEON SLOAN
Alex TUNNER

AGENT.

United States Patent Office 3,321,354
Patented May 23, 1967

3,321,354
APPARATUS FOR MAKING GUSSETED
PLASTIC BAGS
Douglas McCutcheon Sloan, St. Hilaire, Quebec, and Alex Turner, Montreal, Quebec, Canada, assignors to Canadian Industries Limited, Montreal, Quebec, Canada, a corporation of Canada
Filed Aug. 11, 1964, Ser. No. 388,906
Claims priority, application Great Britain, Oct. 7, 1963, 39,406/63
2 Claims. (Cl. 156—499)

ABSTRACT OF THE DISCLOSURE

An apparatus for making heat-sealed gusseted plastic bags by transverse sealing of a flattened gusseted tube. A preheating member is inserted into the reentrant fold of the gusset to preheat the same at the sealing position prior to the transverse sealing and severing steps, permitting the making simultaneously of strong seals in both the four-ply and two-ply regions of the bag.

This invention relates to an improved method of manufacturing gusseted plastic bags and to an apparatus for use in said method.

Bags manufactured from plastic film have found widespread use in packaging applications and materials that have been packaged in such bags range from confectionery to chemical fertilizers. The bags are commonly manufactured from tubular film by heat-sealing transversely and cutting to the required length.

When bags are manufactured from simple flat tubular film, bags known as "pillow bags" result. These "pillow" bags" have disadvantages in that they require a relatively large amount of film for a given bag volume. In addition they are difficult to stack when filled and their sharp corners tend to puncture adjacent bags.

An improved type of bag can be manufactured from gusseted tubular film. This type of bag has re-entrant folds on each side. Gusseted bags possess advantages in comparison with "pillow bags" in that the filled bags, being square, are neater in appearance and stack more readily. A well known type of gusseted bag is made by heat-sealing flattened gusseted tubular plastic film transversely to the tube direction, using the bar sealing equipment employed in making "pillow bags," thus sealing both the two-ply and four-ply sections of film. However, it is difficult to heat seal both of the aforesaid sections of film with the usual bar sealing equipment owing to the different thicknesses of film to be heated to sealing temperature. The problem becomes especially serious in the case of the heavy gauge film employed in large size bags for use in packaging bulk materials such as fertilizer. With metal heat sealing bars, when the gap between the bars is adjusted so that it is suitable for the heat-sealing of the four-ply region of film, the two-ply region is not heated adequately; on the other hand, when the bars are adjusted to a narrower gap to enable a uniform seal to be obtained in the two-ply region, the bars tend to cut into the film in the four-ply region thus making a poor seal in the latter region. To enable the sealing bars to accommodate to the variable thickness of the gusseted film, these can be tipped with pads of silicone rubber. However owing to the thickness of the heavy gauge film, it is not possible to heat both the four-ply and two-ply regions of the film simultaneously to a heat sealing temperature. The result is that either the two-ply or the four-ply region is not properly sealed. It is understood that the seal in the four-ply section must join all four thicknesses of film.

It is an object of this invention to provide a method of manufacturing gusseted plastic bags wherein effective transverse sealing of both four-ply and two-ply sections of the film is obtained. An additional object is to provide a means of preheating the sections of film to be sealed prior to the sealing of the same. Additional objects will appear hereinafter.

The improved method of manufacturing gusseted plastic bags comprises preheating the film in the re-entrant gusset fold of the gusset in the area where the transverse heat-seal is to be made and then heat-sealing transversely by means of resilient transverse heat sealing bars and cutting the film adjacent to the transverse seal.

The preheating of the gusseted region of the tubular film makes it possible for the uniformly heated bar sealers on the bag making machine to raise both four-ply and two-ply zones of the heavy gauge film to a uniform sealing temperature.

A suitable apparatus for preheating the gusseted tubular film comprises a lower transverse resilient bar of length equivalent to the width of the flattened gusseted tubular film, a matching analogous upper transverse resilient bar and two lateral heating blades adapted to fit into the re-entrant folds of the gussets with means to controllably press the gusseted tubular film between said transverse bars and lateral blades. Optionally the transverse bars may be heated.

Alternatively the film in the gusset may be maintained in contact with the blade heaters by means of guides.

This preheating device must be employed in combination with a transverse bar sealing bag making machine of the type employed to manufacture "pillow bags" and which is equipped with resilient sealing bars. The bag making machine provides means of transporting the tubular film and means of transverse sealing and cutting of the same. The aforesaid preheating device is attached to the bar sealing machine so that the area of the gusseted tubing to be preheated is located one bag length in advance of the sealing bars and transverse cutting shears. The controls of the preheater and the sealing bars are co-ordinated so that when the transverse seal is being made, an analogous strip of gusseted tubing one bag length distant on the input side of the sealer is being preheated. The bar sealing machine employed is so designed that the flat tubular film is advanced intermittently in increments equivalent to one bag length.

The improved method of manufacturing gusseted plastic bags is illustrated in the accompanying drawings wherein:

FIGURE 4 is a cross-section through a particular embodiment of the preheater device;

Figure 1:
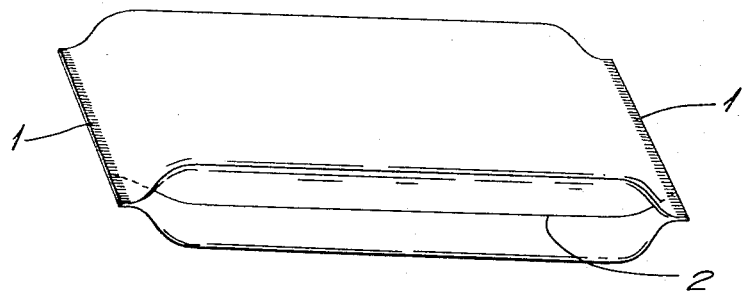
FIGURE 1 is a perspective view of a filled gusseted bag.
Figure 2:
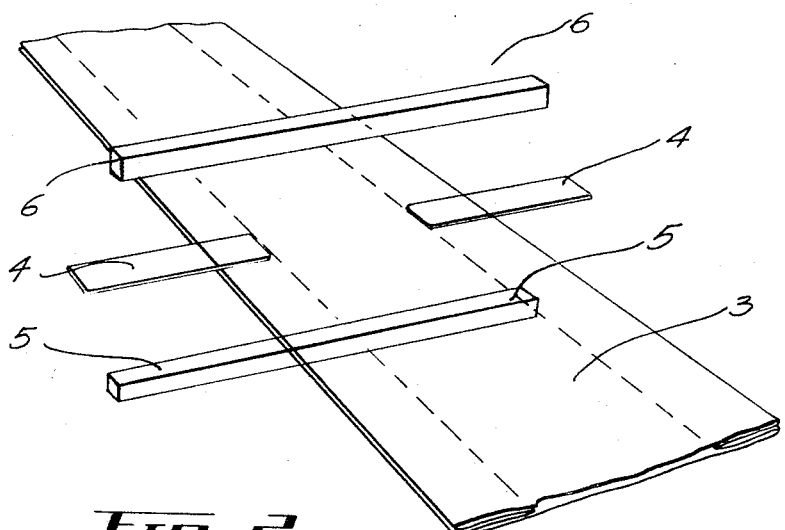
FIGURE 2 is a perspective, partly sectional view of the preheater blades and transverse bars in juxtaposition to the gusseted tubular film.
Figure 3:
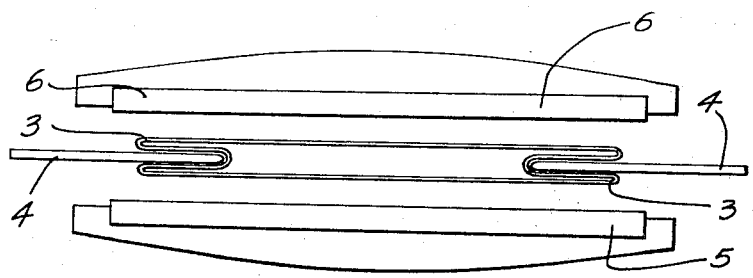
FIGURE 3 is a cross-section through the preheater blades, transverse bars and gusseted film.

In FIGURE 1, a filled gusseted plastic bag the type manufactured by the method of this invention is shown. The seal is shown at 1 and at 2 is indicated the central fold line of the gusset. In FIGURE 2 a length of flattened gusseted tubular film is shown at 3. Two lateral heating blades 4 are shown inserted into the folds of the gussets. At 5 is shown the lower transverse bar and at 6 the upper transverse bar. A sectional view of the heating blades and transverse bars in relation to the gusseted film is shown in FIGURE 3. During the preheating operation the upper and lower transverse bars are brought together, pressing the re-entrant fold of the gusset against the preheating blades. In this manner the inner plies of film of the gusset in the sealing area are heated.

Figure 6:
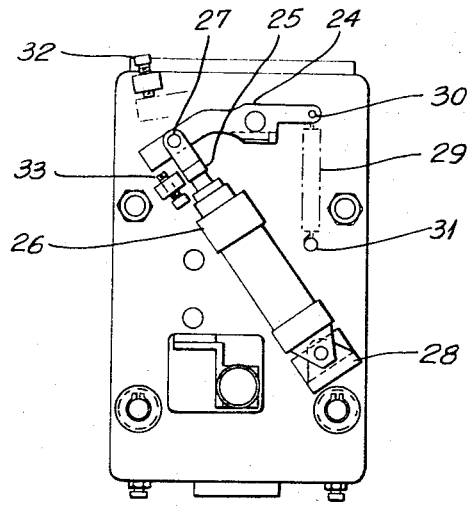
FIGURE 6 is a plan view of the right hand side of the device of FIGURE 4.
Figure 5:
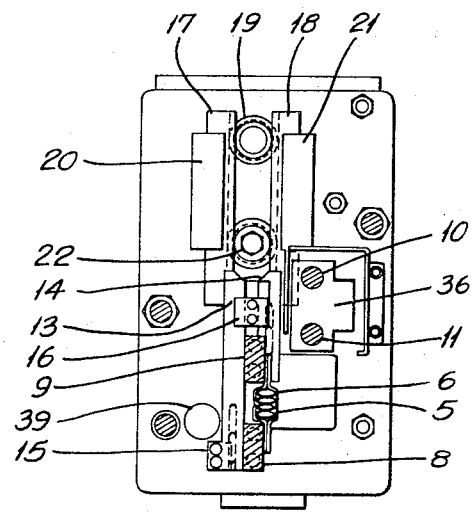
FIGURE 5 is a section through A—A of the device of FIGURE 4.

FIGURE 4 shows a particular embodiment of the preheating device with FIGURES 5 and 6 providing additional details. The lateral heaters 4 are mounted on carriages 7 which are movably mounted on the two shafts 10 and 11. In this manner the lateral preheaters are adjustable with respect to the gusset of the tubular film. The lower transverse bar 5 is fastened to a lower beam 8 and the upper transverse bar 6 is fastened to the upper beam 9. The transverse bars are fitted with resilient surface pads and are heated. Each extremity of the lower beam is attached to an arm 13 free to move in a vertical sense being maintained in alignment by the guides 15 and 16. Similarly, each extremity of the upper beam is attached to an arm 14 free to move in a vertical sense being maintained in alignment by the guide 16. The upper extremities of the arms 13 and 14 are attached to racks 17 and 18 respectively which are held in mesh with the spur gear 19 by plates 20 and 21 in combination with the idler gear 22. The spur gear 19 is attached to and powered by the shaft 23. It is understood that each extremity of each transverse beam is attached to a similar means of bringing together or separating the transverse bars. The power to operate the transverse bar positioning mechanism is transmitted to the shaft 23 by the arm 24 attached to the shaft extremity lying external to the framework 12. The arm 24 is actuated by the piston 25 and air cylinder 26 through the clevis coupling 27. The air cylinder is attached to the framework 12 by the bracket 28. The transverse bars are normally in an open position, this being maintained by the action of the helical spring 29 attached to the arm 24 at 30 and the framework at 31. The travel of the arm 24 is limited by the adjustable stops 32 and 33.

The lateral preheater blades are maintained in close contact with the re-entrant folds of the gusset by the constant tension springs 34 and 35 running between the central spacer 36 and the free running drums 37 and 38 mounted on the carriages 7.

At 39 is shown a freely rotating roller lying on the input side of the preheater and which serves to feed the gusseted film between the transverse bars.

To operate the preheater device, the flat gusseted tubular film is run through the space between the upper and lower transverse bars and the ends of the lateral preheater blades are then inserted into the tube gussets. When compressed air is admitted to the operating cylinder, the transverse bars come together and press the gussets against the preheater blades, raising the temperature of the film in the gusset above the temperature of the rest of the tubular film. When the air pressure is released the preheater transverse bars separate and the preheated film is advanced one bag length to the transverse sealing bars of the bag making machine.

Figure 7:
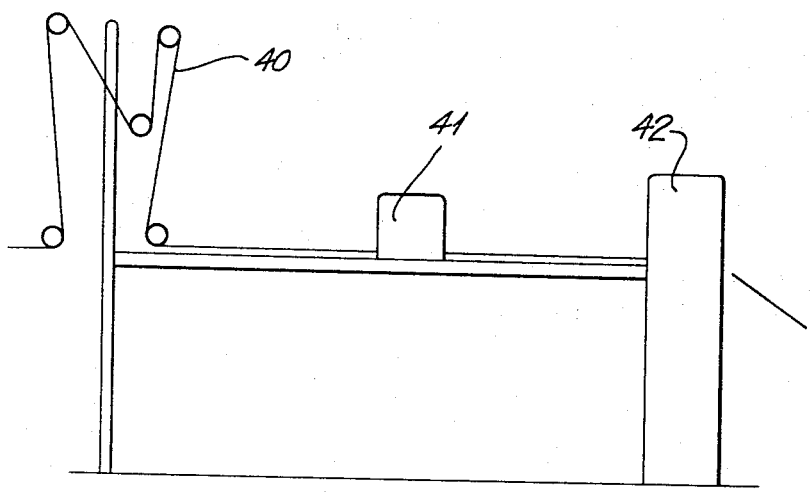
FIGURE 7 is a diagrammatic view of the preheater device mounted in operating position on a bag making machine.

The relation of the hereinbefore described preheating device to the bag making machine with which it is employed is shown in FIGURE 7. At 40 is indicated the system of film-carrying rolls which permit the film to be advanced intermittently in increments of length equivalent to the film utilized to form a single bag. From the rolls the film passes through the preheater device 41 to the system of transverse sealer bars and cutters at 42. The distance between the preheater bars in 41 and the heat sealing bars in 42 should be one bag length. The compressed air actuating the preheater device is controlled so that at the same time that a transverse seal is being made at 42 an analogous strip of tube is being preheated at 41. The sealing and preheating operations take place only when the film is stationary. The controls are programmed so that the preheater transverse bars open before the film advances.

It has been found that superior gusset seals are obtained when the external surface of the film in the gusset is untreated. The treatment, which may serve to improve the reception by the film of printing inks is detrimental to the sealing of the external film surfaces in the re-entrant fold of the gusset. Similarly, surface contamination impairs the gusset seal.

It has also been found that the making of the transverse seals is improved by employing silicone rubber tipped sealing bars on the transverse sealing means of the bag making machine since the flexible silicone rubber tip is able to conform to the differing film thicknesses of the four-ply and two-ply sections of the gusseted tubular film. In a like manner it is desirable that the preheater transverse bars have flexible surfaces in order to conform to the varying thicknesses of the gusseted film. The lateral preheating blades which fit into the film gussets are conveniently covered with glass cloth or may be coated with polytetrafluoroethylene.

The method of manufacturing gusseted plastic bags may be applied to any type of heat sealable plastic film. Suitable materials are polyethylene, polyvinyl chloride and polyvinylidene chloride.

It is convenient to employ the heat sealable film in the form of lengths of flattened gusseted tubing. This type of tubing is available commercially, being made by the extrusion of molten plastic. Alternatively, the gusseted tubing may be prepared by the longitudinal sealing of the edges of superimposed double sheets of plastic with subsequent gusset formation. The transverse dimensions of the bag thus will correspond to the transverse dimensions of the gusseted tubing.

The manufacturing method of this invention makes it possible to form gusseted bags from heavy gauge gusseted tubular plastic film thus making possible the use of gusseted bags in heavy duty service.

The method of manufacturing gusseted bags is illustrated in the following example.

*Example*

A series of gusseted bags was prepared from a length of flat gusseted polyethylene tubing which in the flattened configuration was 16 inches wide with a gusseted fold 2½ inches deep on each side of the flattened tube. The film in the tubing was 8 mils thick.

An experimental preheater unit of the type shown in FIGURES 4, 5 and 6 was mounted on a commercial bag making machine suitable for the production of polyethylene "pillow bags," said machine being equipped with silicone rubber-tipped heat-sealing bars, so that said preheater was adapted to preheat a transverse strip of gusseted film one bag length in advance of the transverse sealing bars of the bag making machine. The length of flattened gusseted tubing was then passed around the film-controlling rolls of the bag making machine, through the preheater and through the sealing-cutting units. The controls of the preheating unit were co-ordinated with the controls of the transverse sealing unit so that the preheating and sealing operation were synchronized. The cutting shears of the sealing-cutting unit cut the gusseted film on the output side of the transverse seal. The sealed bags thus issued from the machine bottom first.

With the film in position the machine was set in operation and bags were produced. The bags had strong seals in both the four-ply and two-ply sections of the transverse seam. In the filled configuration the bags were 24 inches long, 16 inches wide and 5 inches deep.

What we claim is:

1. An apparatus for making gusseted plastic bags which comprises, in combination, means for advancing lengthwise a length of flattened gusseted flexible plastic tube by intermittent motion in increments equivalent to one bag length; preheating members adapted to fit into the re-entrant folds of said tube at transversely opposite positions; upper and lower transverse members adapted in cooperation to press the tube gussets against said preheating members during a predetermined time interval; means for transversely heat sealing said tube at a position including the preheated portion of the tube; and means for cutting said tube at a position adjacent to said transverse seal, said preheating, sealing and cutting means being adapted to operate when the tube is stationary.

2. An apparatus for preheating the re-entrant folds of gusseted flexible plastic tube which comprises, internally directed, transversely adjacent blade heaters adapted to fit into the re-entrant folds of said gusseted tube; means for inserting and withdrawing said heater blades from said re-entrant folds; cooperating upper and lower pressure members adapted to press the tube gussets against said inserted preheater blades for a predetermined time interval; and control means for coordinating the operation of said preheater blades and pressure members.

References Cited by the Examiner

UNITED STATES PATENTS

| | | | |
|---|---|---|---|
| 2,320,326 | 5/1943 | Avery | 93—18 |
| 2,715,087 | 8/1955 | Barradas | 53—373 |

EARL M. BERGERT, *Primary Examiner.*

D. J. DRUMMOND, *Examiner.*